(12) United States Patent
Hashimoto

(10) Patent No.: US 7,934,872 B2
(45) Date of Patent: May 3, 2011

(54) DRAWN CUP ROLLER BEARING AND METHOD OF PRODUCING DRAWN CUP ROLLER BEARING

(75) Inventor: Kenichi Hashimoto, Oume (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 497 days.

(21) Appl. No.: 12/076,412

(22) Filed: Mar. 18, 2008

(65) Prior Publication Data

US 2008/0232733 A1 Sep. 25, 2008

(30) Foreign Application Priority Data

Mar. 19, 2007 (JP) .................. 2007-070736

(51) Int. Cl.
*F16C 33/58* (2006.01)
*F16C 33/64* (2006.01)
(52) U.S. Cl. ............... 384/564; 384/569; 29/898.067
(58) Field of Classification Search .............. 384/425, 384/470, 477, 484, 559, 564, 569, 572, 625; 29/898.067
See application file for complete search history.

(56) References Cited

U.S. PATENT DOCUMENTS

| | | | | |
|---|---|---|---|---|
| 3,284,145 A | * | 11/1966 | Bixby | 384/484 |
| 3,957,278 A | * | 5/1976 | Rabe | 384/484 |
| 4,854,738 A | * | 8/1989 | Linnemeier | 384/564 |
| 5,419,641 A | * | 5/1995 | Fujinami et al. | 384/484 |
| 5,615,956 A | * | 4/1997 | Oba et al. | 384/470 |
| 6,161,961 A | * | 12/2000 | Diemer | 384/420 |
| 6,186,668 B1 | * | 2/2001 | Beaman | 384/486 |
| 6,478,470 B1 | * | 11/2002 | Bode | 384/569 |
| 7,661,883 B2 | * | 2/2010 | Gresley | 384/485 |
| 7,758,251 B2 | * | 7/2010 | Akamatsu | 384/625 |

FOREIGN PATENT DOCUMENTS

| | | | |
|---|---|---|---|
| FR | 2200921 A | * | 5/1974 |
| JP | 2001-099145 | | 4/2001 |
| JP | 2002-089550 | | 3/2002 |
| JP | 2005-163994 | | 6/2005 |

* cited by examiner

*Primary Examiner* — Marcus Charles
(74) *Attorney, Agent, or Firm* — McGinn IP Law, PLLC

(57) ABSTRACT

A drawn cup roller bearing includes: a drawn cup outer ring that includes a cylindrical portion serving as an outer raceway surface, a first rib which is formed at one axial end portion of the cylindrical portion and is bent radially inwardly such that a step portion is formed at an intermediate portion of the first rib, and a second rib which is formed at the other axial end portion of the cylindrical portion and is radially inwardly folded back; an annular seal which is press-fitted in the step portion; and a cage which holds a plurality of rollers and is inserted into the drawn cup outer ring from the second rib to be mounted in the drawn cup outer ring in such a manner that the cage is retained against withdrawal by the step portion and the plurality of rollers is retained against withdrawal by the second rib.

11 Claims, 2 Drawing Sheets

DRAWN CUP ROLLER BEARING AND METHOD OF PRODUCING DRAWN CUP ROLLER BEARING

BACKGROUND OF THE INVENTION

This invention relates to a drawn cup roller bearing used, for example, as a bearing for a vehicle starter and also to method of producing such a drawn cup roller bearing.

In a conventional drawn cup roller bearing, first, only one end portion of an outer ring is bent (pre-bent) at an angle of 90 degrees to form a rib, and in this condition a cage holding a plurality of rollers and an annular seal with a metal core are mounted in the outer ring, and thereafter the other end portion of the outer ring is bent (post bent) to form a rib, thereby preventing the cage and the annular seal with the metal core from being withdrawn from the outer ring (see, for example, JP-A-2001-99145).

In such a conventional drawn cup roller bearing, first, only the one end portion of the outer ring is bent (pre-bent) to form the rib, and in this condition the cage holding the rollers and the annular seal with the metal core are mounted in the outer ring, and thereafter the other end portion of the outer ring is bent (post bent) to form the rib. Therefore, in order to prevent the development of a crack during the bending operation, only the portion of the heat treated outer ring which is to be post bent is again subjected to induction annealing, or an anti-carbonization treatment is applied only to the portion to be post bent, and by doing so, the hardness is lowered. However, there has been encountered a problem that such method requires an additional step which increase the cost.

Furthermore, when these treatments are applied to the portion of the outer ring to be post bent, there is a possibility that secondary problems, such as a shortened life due to lowered hardness of a raceway and the cracking of the bent portion due to insufficient annealing, arise, and also there has been encountered a problem that a press-fitting direction is limited because of an insufficient strength of the post bent portion.

Furthermore, a sliding contact surface formed at an end portion of the cage contacts the seal, and therefore the annular seal is required to have the metal core so as to prevent damage of the seal due to this contact, which has invited a problem that the cost increases accordingly.

Furthermore, the annular seal is pushed to the end portion of the outer ring. However, there is not provided any means for holding the thus mounted annular seal in position in the axial direction, and therefore in the worse case, there has been encountered a problem that the annular seal is caught by the cage.

Furthermore, in the case where each roller has a large diameter, the size of the annular seal in the radial direction is also increased, which has invited a problem that the material cost of the annular seal increases.

SUMMARY OF THE INVENTION

This invention has been made in order to solve the above problems, and an object of the invention is to provide a drawn cup roller bearing in which the step of post bending an outer ring, the step of applying induction annealing to the outer ring, and the use of a metal core in an annular seal are omitted, and the positioning of the annular seal in an axial direction is positively effected, and the annular seal will not be caught by a cage, and the production cost can be reduced. Another object of the invention is to provide a method of producing this drawn cup roller bearing.

According to one aspect of the present invention, there is provide an drawn cup roller bearing comprising:

a drawn cup outer ring that includes:
a cylindrical portion serving as an outer raceway surface;
a first rib which is formed at one axial end portion of the cylindrical portion and is bent radially inwardly such that a step portion is formed at an intermediate portion of the first rib; and
a second rib which is formed at the other axial end portion of the cylindrical portion and is radially inwardly folded back;

an annular seal which is press-fitted in an inner peripheral surface of the step portion; and a cage which holds a plurality of rollers and is inserted into the drawn cup outer ring from the second rib to be mounted in the drawn cup outer ring in such a manner that the cage is retained against withdrawal by the step portion and the plurality of rollers is retained against withdrawal by the second rib.

Preferably, the annular seal is formed of an elastic material having no metal core, and the annular seal includes an annular body portion press-fitted in the inner peripheral surface of the seal-receiving step portion of the drawn cup outer ring, and a lip formed on an inner peripheral surface of the annular body portion and adapted to be held in contact with a rotation shaft serving as an inner raceway surface.

According to another aspect of the invention, there is provided a method of producing a method of producing a drawn cup roller bearing, the method comprising:

preparing a drawn cup outer ring that includes:
a cylindrical portion serving as an outer raceway surface;
a first rib which is formed at one axial end portion of the cylindrical portion and is bent radially inwardly such that a step portion is formed at an intermediate portion of the first rib; and
a second rib which is formed at the other axial end portion of the cylindrical portion and is radially inwardly folded back;

applying a hardening treatment to the whole of the drawn cup outer ring;

press-fitting an annular seal into the step portion such that an outer peripheral surface of an annular body portion of the annular seal is held in contact with an inner peripheral surface of the step portion; and inserting a cage, holding a plurality of rollers, into the drawn cup outer ring such that the cage is pressed against the step portion and the plurality of rollers are fitted in an inner end surface of the second rib, thereby completing the drawn cup roller bearing.

As described above, in the drawn cup roller bearing of the invention and the method of producing this drawn cup roller bearing, the drawn cup outer ring includes the cylindrical portion serving as the outer raceway surface, the first rib which is formed at the one axial end portion of the cylindrical portion and is bent radially inwardly such that the seal-receiving step portion is formed at the intermediate portion of the first rib, and the second rib which is formed at the other axial end portion of the cylindrical portion and is radially inwardly folded back. The annular seal is press-fitted in the seal-receiving step portion of the first rib of the drawn cup outer ring to be mounted therein. The cage holding the plurality of rollers is inserted into the drawn cup outer ring from the second rib of the drawn cup outer ring to be mounted in the drawn cup outer ring in such a manner that the one end of the cage is retained against withdrawal by the seal-receiving step portion while the other end of the cage is retained against withdrawal by the second rib. For assembling this drawn cup roller bearing, the annular seal is press-fitted into the seal-receiving step portion of the first rib of the hardened drawn cup outer ring such that the outer peripheral surface of the annular body portion of the annular seal is held in contact with the inner peripheral surface of the seal-receiving step portion. Subsequently, the cage holding the plurality of rollers is inserted into the drawn cup outer ring such that the one end of the cage is pressed against the seal-receiving step portion while the ends of the plurality of rollers of the cage which are disposed remote from the one end of the cage are fitted in the inner end surface of the second rib of the drawn cup outer ring, thereby completing the drawn cup rollerbearing. Therefore, even when the rotation shaft is inserted into the thus completed roller bearing from the radially inwardly folded-back rib (second rib) of the drawn cup outer ring, the annular seal, though not provided with a metal core, will not be caught by the cage, since the annular seal is held between the inner peripheral surface of the seal-receiving step portion and the outer peripheral surface of the rotation shaft and hence is retained in position. Also, when withdrawing the rotation shaft, the annular seal is prevented from being disengaged from its mounting position.

Furthermore, the annular seal is press-fitted into the inner peripheral surface of the seal-receiving step portion formed at the intermediate portion of the radially inwardly-bent rib (first rib) of the hardened drawn cup outer ring, and then the cage holding the plurality of rollers is mounted in the outer ring. Therefore, the step of applying induction annealing or other treatment to the portion of the outer ring to be post bent as in the conventional method is omitted, and therefore the cost can be reduced.

Furthermore, hardening is applied to the whole of the drawn cup outer ring, and therefore the drawn cup outer ring has a uniform strength over the entire area thereof, and the rotation shaft can be forced into (or press-fitted) into the drawn cup outer ring having the cage (holding the plurality of rollers) mounted therein.

Furthermore, the diameter of the annular seal can be reduced by an amount corresponding to the height of the seal-receiving step portion, and hence the volume of the annular seal is reduced, and therefore the cost can be reduced.

Furthermore, the annular seal is formed of the elastic material having no metal core, and the annular seal includes the annular body portion press-fitted in the inner peripheral surface of the seal-receiving step portion of the drawn cup outer ring, and the lip formed on the inner peripheral surface of the annular body portion and adapted to be held in contact with the rotation shaft serving as the inner raceway surface. Therefore, the cost can be reduced, and the cage holding the plurality of rollers can be post mounted in the bearing.

DETAILED DESCRIPTION OF PREFERRED EMBODIMENTS

Figure 1:
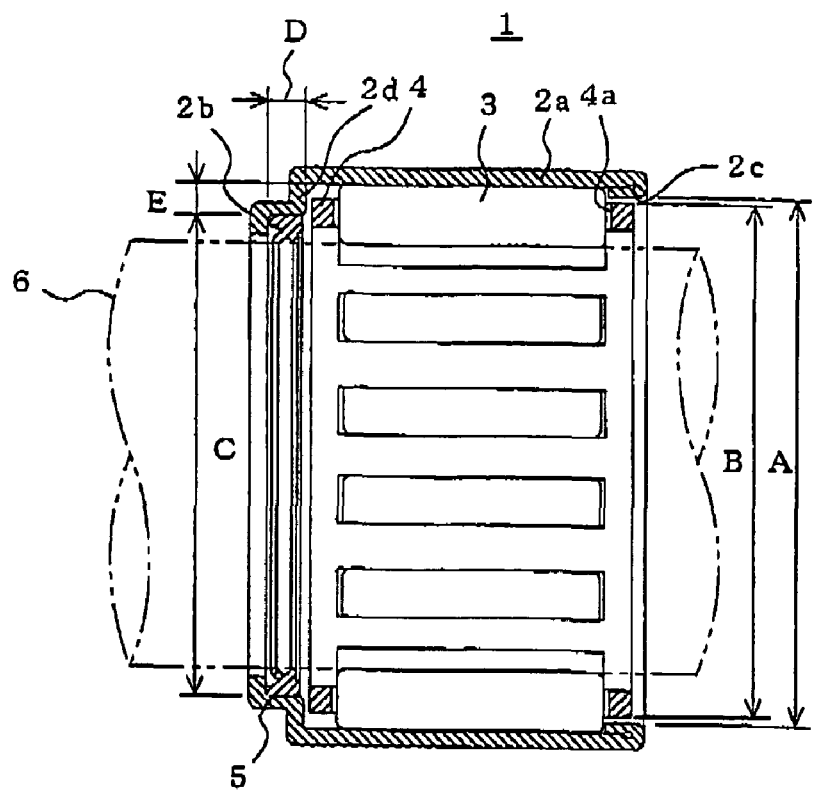
FIG. 1 is a cross-sectional view of a first embodiment of a drawn cup roller bearing of the present invention.
Figure 2:
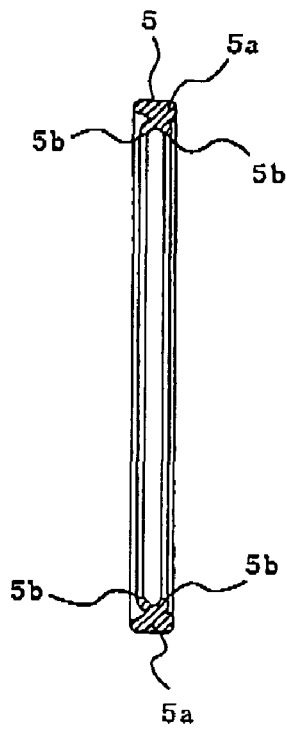
FIG. 2 is a cross-sectional view showing a seal of the drawn cup roller bearing.
Figure 3:
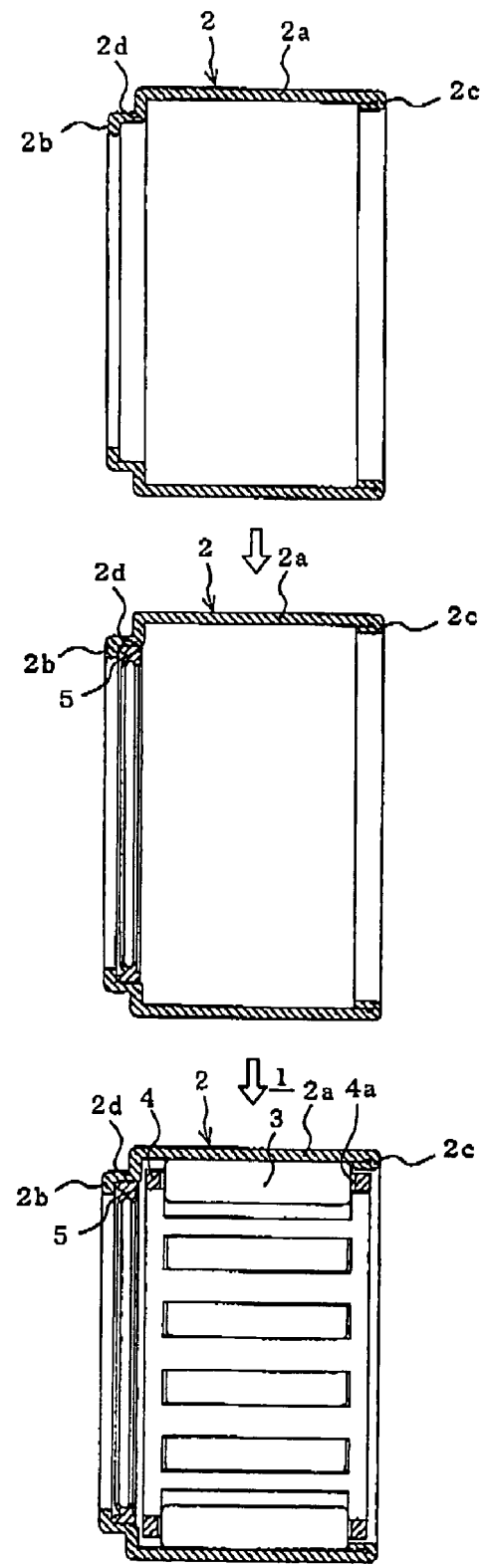
FIG. 3 is an illustration showing the process of producing the drawn cup roller bearing.

FIG. 1 is a cross-sectional view of a first embodiment of a drawn cup needle roller bearing (drawn cup roller bearing) of the present invention, FIG. 2 is a cross-sectional view showing a seal of the drawn cup needle roller bearing, and FIG. 3 is an illustration showing the process of producing the drawn cup needle roller bearing.

The first embodiment is directed to the drawn cup needle roller bearing which is one example of drawn cup roller bearings.

The drawn cup needle roller bearing 1 of this first embodiment includes a cage 4 (holding a plurality of needle rollers 3) received within a drawn cup outer ring 2, and the annular seal 5 mounted within the outer ring 2 and disposed at one axial side of the cage 4.

A rotation shaft 6 serving as an inner raceway for the needle rollers 3 passes through an inner periphery of the drawn cup needle roller bearing 1 as indicated by dots-and-dash lines in FIG. 1.

The outer ring 2 is formed by pressing a single metal sheet into a cylindrical shape, and this outer ring 2 includes a cylindrical portion 2a serving as an outer raceway for the needle rollers 3. A rib (first rib) 2b is formed at one axial end portion of the cylindrical portion 2a, and is bent radially inwardly at an angle of 90 degrees such that a seal-receiving step portion 2d for receiving the annular seal 5 is formed at an intermediate portion of the rib 2 (that is, intermediate axially-opposite ends of the rib 2b). A rib (second rib) 2c is formed at the other axial end portion of the cylindrical portion 2a, and is bent radially inwardly at an angle of 180 degrees, that is, radially inwardly folded back.

An inside diameter A of the radially inwardly folded-back rib 2c of the outer ring 2, an inside diameter C of a seal receiving surface (that is, a diameter of an inner peripheral surface) of the seal-receiving step portion 2d of the 90-degree radially inwardly-bent flange 2b, an outside diameter B of the cage 4 received in the outer ring 2 and an axial length D (from an inner end of the step portion 2d to an inner end surface of the rib 2b) of the step portion 2d are so determined that the following relations are established. Incidentally, a height of the seal-receiving step portion 2d is represented by E in FIG. 1.

C<A, C<B, D>(a width of the seal 5)

The rib 2b of the outer ring 2 serves as a retainer for preventing withdrawal of the seal 5, and the seal-receiving step portion 2d serves as a retainer for preventing withdrawal of the cage 4 at one end thereof, and the rib 2c of the outer ring 2 serves as a retainer for preventing withdrawal of the needle rollers 3 at the other end of the cage 4.

The cage 4 has a plurality of pockets 4a formed in its peripheral wall, and the needle rollers 3 are rotatably received respectively in the pockets 4a in such a manner that the needle rollers 3 will not be withdrawn radially inwardly from the respective pockets 4a.

The annular seal 5 includes an annular body portion 5a fitted in the seal-receiving step portion 2d of the rib 2h of the drawn cup outer ring 2, and lips 5b formed on an inner peripheral surface of the annular body portion 5a and held in contact with the rotation shaft 6.

As shown in FIG. 2, the annular seal 5 is formed solely of an elastic material such as rubber or a resin, and therefore has no metal core.

Thus, the seal 5 has no metal core, and is made solely of the elastic material, and therefore the seal 5 can be produced at a lower cost as compared with a conventional seal with a metal core.

Next, a procedure or process of producing the drawn cup needle roller bearing 1 of the first embodiment will be described briefly.

In the manufacture of the drawn cup outer ring 2, first, a low-carbon steel sheet is pressed into a cylindrical shape to form the cylindrical portion 2a. Then, one axial end portion of the cylindrical portion 2a is bent to form the rib 2b which is bent radially inwardly at an angle of 90 degrees such that the seal-receiving step portion 2d is formed at an intermediate portion of the rib 2b. Further, the other axial end portion of the cylindrical portion 2a is bent to form the rib 2c which is bent radially inwardly at an angle of 180 degrees, that is, radially inwardly folded back. The cylindrical portion 2a and the seal-receiving step portion 2d may be formed at the same time by pressing.

Finally, a hardening (quenching) treatment is applied to the whole of the drawn cup outer ring 2 having the above bent opposite end portions, thereby imparting required strength and harness thereto. Such a hardening (quenching) treatment is well known, and therefore description thereof will be omitted.

Then, the cage 4 holding the plurality of rollers 3 and the annular seal 5 are inserted into the thus hardened drawn cup-type outer ring 2 (shown in FIG. 3A) to be mounted therein. At this time, first, the seal 5 is press-fitted into the step portion 2d (formed at the intermediate portion of the 90-degree radially inwardly bent rib 2b of the drawn cup outer ring 2) in such a manner that the annular body portion 5a of the seal 5 is held in contact with the inner peripheral surface of the step portion 2d as shown in FIG. 3B.

Then, the cage 4 holding the plurality of rollers 3 is inserted into the drawn cup outer ring 2 to be mounted therein.

At this time, in the case where the cage 4 is made of a resin, the peripheral wall (having the pockets 4a formed therethrough) of the cage 4 has a relatively large thickness, and therefore the cage 4 can be so constructed that the rollers 3 are prevented from being withdrawn or displaced radially inwardly and outwardly. In this case, the cage 4 having the rollers 3 set therein can be inserted into the drawn cup outer ring 2.

The one end of the cage 4 is pressed against the seal-receiving step portion 2d, and in this condition those ends of the plurality of rollers 3 remote from the one end of the cage 4 are fitted in an inner end surface (or inner edge) of the radially inwardly folded-back rib 2c of the drawn cup outer ring 2.

As a result, the plurality of rollers 3 held by the cage 4 are rotatably received respectively in the pockets 4a in such a manner that the rollers 3 will not be withdrawn radially inwardly and outwardly from the respective pockets 4a. Thus, the mounting of the cage 4 (holding the plurality of rollers 3) and the seal 5 in the drawn cup outer ring 2 is completed as shown in FIG. 3C.

In the first embodiment, there is prepared the drawn cap outer ring 2 including the cylindrical portion 2a, the rib 2b which is formed at the one axial end portion of the cylindrical portion 2a and is bent radially inwardly at the angle of 90 degrees such that the seal-receiving step portion 2d is formed at the intermediate portion of the rib 2b, and the rib 2c which is formed at the other axial end portion of the cylindrical portion 2a and is radially inwardly folded back. Then, a hardening (quenching) treatment is applied to the whole of the drawn cup outer ring 2. Then, the annular seal 5 is press-fitted into the seal-receiving step portion 2d formed at the intermediate portion of the 90-degree radially inwardly-bent rib 2b of the hardened (quenched) drawn cup outer ring 2 in such a manner that the body portion 5a of the annular seal 5 is held in contact with the inner peripheral surface of the seal-receiving step portion 2d. Then, the cage 4 holding the plurality of needle rollers 3 is inserted into the drawn cup outer ring 2, and the one end of the cage 4 is pressed against the seal-receiving step portion 2d, and the ends of the plurality of rollers 3 of the cage 4 disposed remote from the one end of the cage 4 are fitted in the inner end surface of the radially inwardly folded-back rib 2c of the drawn cup outer ring 2, thereby completing the drawn cup needle roller bearing 1. Therefore, even when the rotation shaft 6 is inserted into the thus completed roller bearing 1 from the radially inwardly folded-back rib 2c of the drawn cup outer ring 2, the annular seal 5, though not provided with a metal core, will not be caught by the cage, since the annular seal 5 is held between the inner peripheral surface of the seal-receiving step portion 2d and the outer peripheral surface of the rotation shaft 6 and hence is retained in position. Also, when withdrawing the rotation shaft 6, the annular seal 5 is prevented from being disengaged from its mounting position.

And besides, since the annular seal is not provided with any metal core, the cost can be reduced, and the cage 4 holding the plurality of needle rollers 3 can be post mounted in the bearing.

Furthermore, the relation, C<A, is established as described above, and therefore when inserting the seal 5 into the seal-receiving step portion 2d, the seal 5 does not need to be deformed radially, and therefore can be smoothly inserted thereinto. Incidentally, even when the annular seal 5 has a metal core, it can be mounted in the outer ring 2, and can be properly used.

Furthermore, the annular seal 5 is press-fitted into the inner peripheral surface of the seal-receiving step portion 2d formed at the intermediate portion of the 90-degree radially inwardly-bent rib 2b of the hardened drawn cup outer ring 2, and then the cage 4 holding the plurality of needle rollers 3 is mounted in the outer ring 2. Therefore, the step of applying induction annealing or other treatment to the portion of the outer ring to be post bent as in the conventional method is omitted, and therefore the cost can be reduced.

Furthermore, hardening (quenching) is applied to the whole of the drawn cup outer ring 2, and therefore the drawn cup outer ring 2 has a uniform strength over the entire area thereof, and the rotation shaft 6 can be forced into (or press-fitted) into the drawn cup outer ring 2 having the cage 4 (holding the plurality of needle rollers 3) mounted therein.

Furthermore, the relation, C<B, and the relation, D>(the width of the seal 5), are established as described above, and therefore when the annular seal 5 is press-fitted into the inner peripheral surface of the seal-receiving step portion 2d formed at the intermediate portion of the rib 2b, the end surface of the cage 4 will not contact the annular seal 5, and therefore the annular seal 5 does not need to have a metal core.

Furthermore, the diameter of the annular seal 5 can be reduced by an amount corresponding to the height E of the seal-receiving step portion 2d, and hence the volume of the annular seal 5 is reduced, and therefore the cost can be reduced.

Furthermore, in the drawn cup needle roller bearing 1, the annular seal 5 positively prevents external foreign matters from intruding into the bearing, and also can make leakage of an inside lubricant less liable to occur, and therefore the satisfactory bearing performance can be maintained stably for a long period of time, and a long life of the bearing can be achieved.

What is claimed is:
1. A drawn cup roller bearing comprising:
a drawn cup outer ring that includes:
  a cylindrical portion serving as an outer raceway surface;

a first rib which is formed at an axial end portion of the cylindrical portion and is bent radially inwardly such that a step portion is formed at an intermediate portion of the first rib; and a second rib which is formed at an other axial end portion of the cylindrical portion and is radially inwardly folded back;

an annular seal which is press-fitted in a radially inner peripheral surface of the step portion such that a radially outermost portion of the annular seal is dispose radially inward of the radially inner peripheral surface of the step portion; and a cage which holds a plurality of rollers and is inserted into the drawn cup outer ring from the second rib to be mounted in the drawn cup outer ring in such a manner that the cage is retained against withdrawal by the step portion and the plurality of rollers is retained against withdrawal by the second rib.

2. The drawn cup roller bearing according to claim 1, wherein the annular seal comprises an elastic material having no metal core, and includes an annular body portion press-fitted in the radially inner peripheral surface of the seal-receiving step portion of the drawn cup outer ring, and a lip formed on an inner peripheral surface of the annular body portion and adapted to be held in contact with a rotation shaft serving as an inner raceway surface.

3. The drawn cup roller bearing according to claim 1, wherein an inside diameter of the inner peripheral surface of the step portion is less than an inside diameter of the second rib.

4. The drawn cup roller bearing according to claim 3, wherein the inside diameter of the radially inner peripheral surface of the step portion is less than an outside diameter of the cage, and an axial length of the step portion is greater than a width of the seal.

5. The drawn cup roller bearing according to claim 4, wherein the first rib prevents withdrawal of the seal.

6. The drawn cup roller bearing according to claim 1, wherein the first rib further comprises an end face, bent radially inward and disposed at an axial end of the first rib opposite the cylindrical portion.

7. The drawn cup roller bearing according to claim 6, wherein an annular portion is formed between the cylindrical portion and the end face of the first rib.

8. The drawn cup roller bearing according to claim 6, wherein an inner diameter of the end face is less than an outer diameter of the seal.

9. The drawn cup roller bearing according to claim 1, wherein the step portion is formed at the axial end portion of the cylindrical portion.

10. The drawn cup roller bearing according to claim 1, wherein the step portion extends radially inward from an inner surface of the cylindrical portion.

11. A method of producing a drawn cup roller bearing, the method comprising:

preparing a drawn cup outer ring that includes:
　a cylindrical portion serving as an outer raceway surface;
　a first rib which is formed at an axial end portion of the cylindrical portion and is bent radially inwardly such that a step portion is formed at an intermediate portion of the first rib; and
　a second rib which is formed at an other axial end portion of the cylindrical portion and is radially inwardly folded back;

applying a hardening treatment to the whole of the drawn cup outer ring;

press-fitting an annular seal into the step portion such that an outer peripheral surface of an annular body portion of the annular seal is held in contact with a radially inner peripheral surface of the step portion and a radially outermost portion of the annular seal is disposed radially inward of the radially inner peripheral surface of the step portion; and inserting a cage, holding a plurality of rollers, into the drawn cup outer ring such that the cage is pressed against the step portion and the plurality of rollers are fitted in an inner end surface of the second rib, thereby completing the drawn cup roller bearing.

* * * * *